Nov. 1, 1955
W. D. HEDGES
2,722,495
METHOD FOR PRODUCING A VINYL COATED FABRIC
Filed Aug. 27, 1952
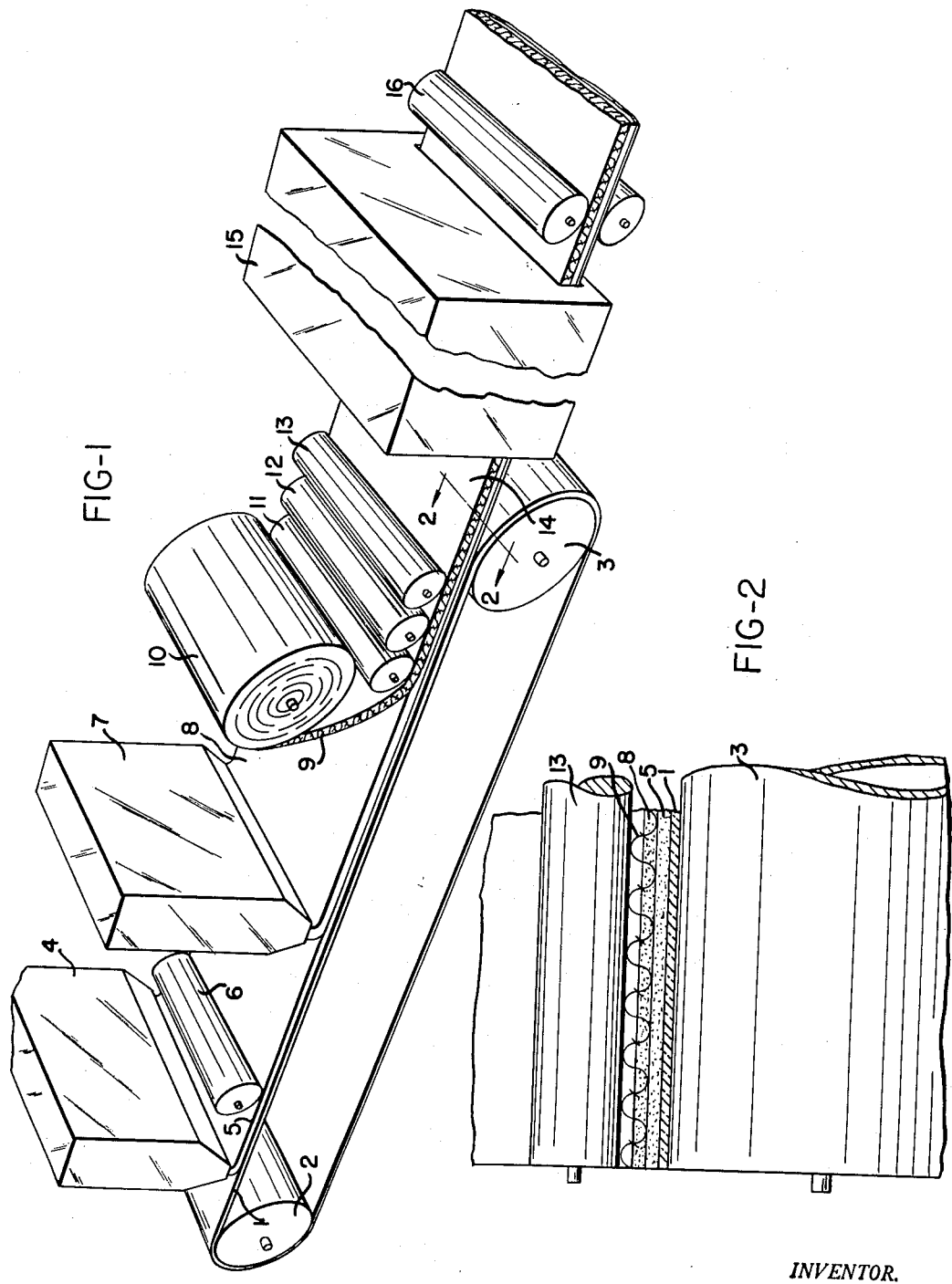
INVENTOR.
WILLIAM D. HEDGES
BY
ATTORNEYS

United States Patent Office 2,722,495
Patented Nov. 1, 1955

2,722,495

METHOD FOR PRODUCING A VINYL COATED FABRIC

William D. Hedges, Columbus, Ohio, assignor to Columbus Coated Fabrics Corporation, Columbus, Ohio, a corporation of Ohio Application August 27, 1952, Serial No. 306,613

1 Claim. (Cl. 154—102)

This invention relates to a method of manufacture and to the product resulting from the method of manufacture of knit goods comprising knitted fabrics which have plastic coatings such as rubber, vinyl resin and similar coatings.

The usual method of coating fabrics or webs is that the web is pulled under some kind of a coating applicator through a drying tunnel. Since most webs have a minimum amount of stretch in the warp direction, the problem of the loss in width during this operation is not too serious. However, when knitted fabric is coated in this manner, there is a tremendous loss in width and it becomes impractical.

There are other methods of applying coating to knitted fabrics. It is possible to apply rubber and vinyl coatings by calendering procedures and it is also possible to apply coatings deposited from latices and solvents, when equipment is available such as a tenter frame to maintain a constant width and to partially eliminate the tremendous tension in the warp direction. All of these procedures, however, are rather cumbersome involving special techniques.

To eliminate these difficulties, it is the object of this invention to combine a calendered vinyl sheet to a knitted woven, or non-woven fabric made from any of the synthetic fibers or from a naturally occurring fiber, or a mixture of the two types.

It is the object of this invention to provide a calendered vinyl sheet of the desired thickness and width and to apply directly to this calendered sheet a paste dispersion resin on which the knitted fabric is mounted while it is in wet or paste form and imbedded therein.

It is a further object to then dry the combination of the vinyl sheet, the paste and the knitted fabric at a temperature gradually increased until fusion takes place in the paste coating to obtain a permanent vinyl bond between the calendered sheet and the knitted fabric.

It is a further object that such a sheet, which will be of uniform dimension, can be embossed as it leaves the fusing chamber, or embossed in a subsequent operation, or printed or given any of the well known decorative effects that are common to coated fabrics.

While the vinyl sheet is shown as being applied and calendered in the attached drawing, it will be understood that a pre-calendered, unsupported vinyl sheet may be employed upon which is mounted the paste and knitted fabric that is conveyed through a drying oven.

Referring to the drawings:

Figure 1 is an isometric perspective of a diagrammatic illustration of the procedure and apparatus of preparing the vinyl sheet, applying the paste, applying the knit goods, conveying the unitary assembly through the drying and fusing oven and thence optionally under calender rolls.

Figure 2 is a section on the line 2—2 looking in the direction of the arrows, showing the combined structure before fusing of the vinyl sheet, the paste and the knitted fabric.

Turning to the drawings, in the event it is desired to prepare the vinyl calendered sheet, the steel transportation belt 1, mounted on the drive rollers 2 and 3, is utilized to receive from the hopper 4, carrying a supply of vinyl material, the extruded sheet 5 which passes under the calender rolls 6. The calendered vinyl sheet is of the conventional type, such as described in U. S. Patent 2,010,963, 1935 (Reissue 20,080). If it is desired to provide a calendered vinyl sheet that is self-supporting, this likewise can be conveyed beneath the paste hopper 7 from which is extruded a layer of resin dispersion paste 8 upon the wet surface thereof is pressed a layer of knit fabric 9 from the roll 10. This fusing of the knitted fabric into the surface paste on the vinyl sheet is accomplished by the rollers 11, 12 and 13. From this point, the composite sheet, as at 14, passes into the oven 15 which is a combined drying chamber and fusion chamber as the temperature is gradually increased until the fusion takes place in the paste coating with the knit goods, thus, obtaining a permanent vinyl bond between the calendered sheet and the knitted fabric.

The completed material may be calendered by the calender roll 16, if desired, or in a later operation. It may be printed or given any of the well known decorative effects that are common to coated fabrics.

While the procedure outlined herein is primarily for knitted fabrics, nevertheless, it can be equally applicable to other materials, particularly non-woven mats made from either natural fibers, synthetic fibers or combinations thereof.

It is also conceivable that this process would offer advantages particularly from the economic standpoint in laminating standard woven fabrics such as sheetings, drills or sateens to a vinyl calendered film.

The vinyl paste coating, which is applied to the film, can vary widely in formulation depending upon the final properties desired in the finished laminated material. We list below several examples of possible formulations:

*Example I*

| | Parts by weight |
|---|---|
| Vinyl resin (paste dispersion type) | 10.0 |
| Clay | 8.0 |
| Di-octyl-phthalate | 6.0 |
| Cadmium stabilizer | .15 |
| Barium stabilizer | .15 |
| Color pigment | 1.0 |
| Mineral spirits | 1.5 |

*Example II*

| | |
|---|---|
| Vinyl resin (paste dispersion type) | 10.0 |
| Di-octyl-phthalate | 3.0 |
| Sebacate | 3.0 |
| Cadmium stabilizer | .15 |
| Barium stabilizer | .15 |
| Color pigment | 1.0 |

The temperatures and pressures have a wide range depending upon the type of materials employed. They can be arrived at by one skilled in the art without difficulty in view of the foregoing explanation.

This method of laminating film and fabric which at first seemed in reverse of ordinary procedure has now appeared to be one of the best possible ways of combining film and fabric of any type. It is a necessary method for combining film and knitted goods, but it is, also, a good way to combine film and woven or non-woven materials.

While the invention disclosed and described herein is that of the preferred modification, yet it will be understood that those modifications that fall within the scope of the appended claim are intended to be included herein.

I claim:

In a method of manufacturing a calendered plastic coated knitted fabric as a continuous sheet, the steps (a) of extruding a vinyl resin plastic in the form of a sheet onto an endless support, (b) calendering said vinyl sheet; the step (c) of applying to the calendered sheet a paste consisting principally of vinyl resin; the step (d) of applying a knitted fabric onto the surface of said paste and pressing the knitted fabric evenly into said paste to imbed the same therein; the step (e) stripping the resultant vinyl resin sheet and knitted fabric adhering thereto from the endless support, and the step (f) of heating the thus coated knitted fabric to bring about a fusion between the vinyl sheet, the vinyl resin paste and the fabric to provide a final laminated sheet product.

References Cited in the file of this patent

UNITED STATES PATENTS

| | | |
|---|---|---|
| 2,213,899 | Brown et al. | Sept. 3, 1940 |
| 2,268,399 | Hurt | Dec. 30, 1941 |
| 2,288,391 | Carman | June 30, 1942 |
| 2,431,745 | Flanagan | Dec. 2, 1947 |
| 2,444,094 | Duggan | June 29, 1948 |
| 2,533,976 | Teague | Dec. 12, 1950 |
| 2,560,420 | Dodge | July 10, 1951 |
| 2,582,294 | Stober | Jan. 15, 1952 |
| 2,586,275 | Toulmin | Feb. 19, 1952 |
| 2,622,052 | Chandler | Dec. 16, 1952 |